2 Sheets—Sheet 2.
S. LEWIN.
ELEVATOR FOR RAISING AND STACKING STRAW.
No. 109,523. Patented Nov. 22, 1870.
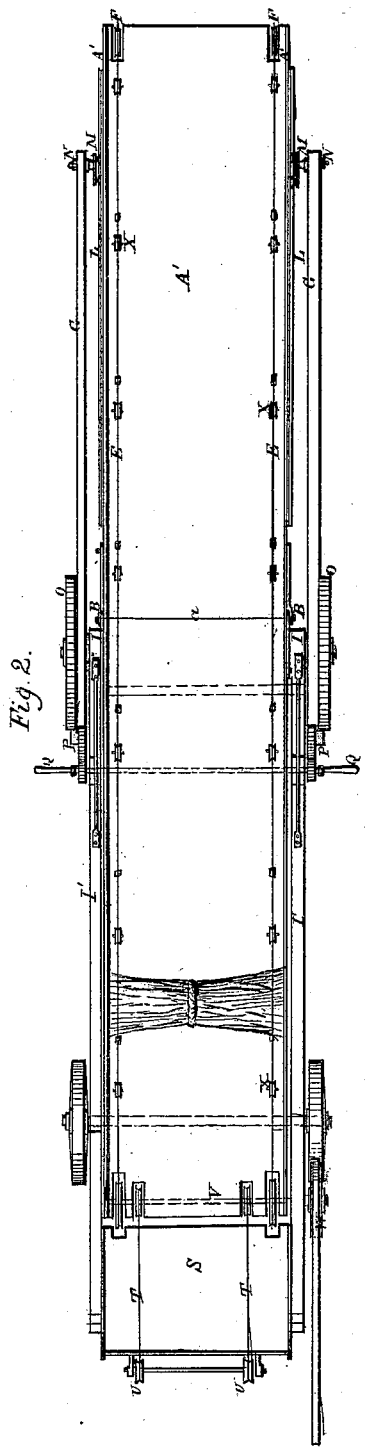
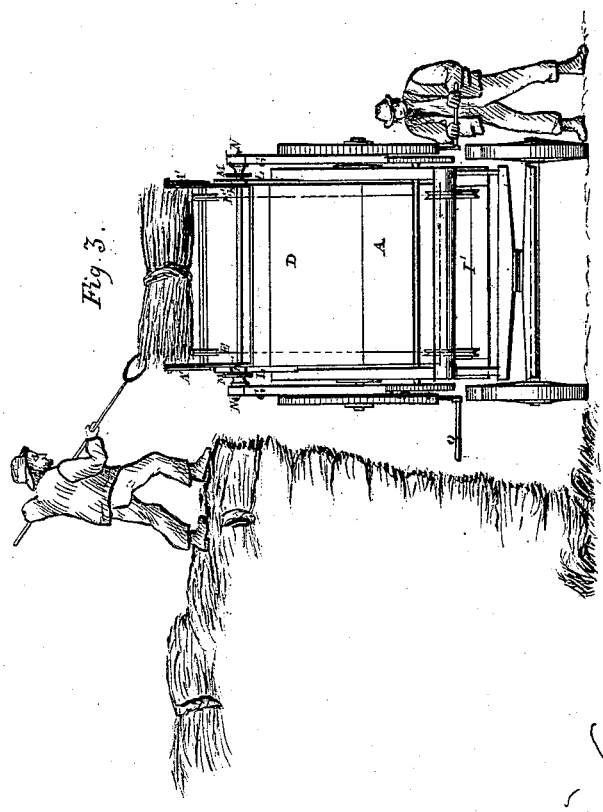
Stephen Lewin, Inventor,
by C. J. Whitman, Attorney.
529 Seventh St.
Washington D.C.
Witnesses,
H. A. Daniels
C. B. Williard

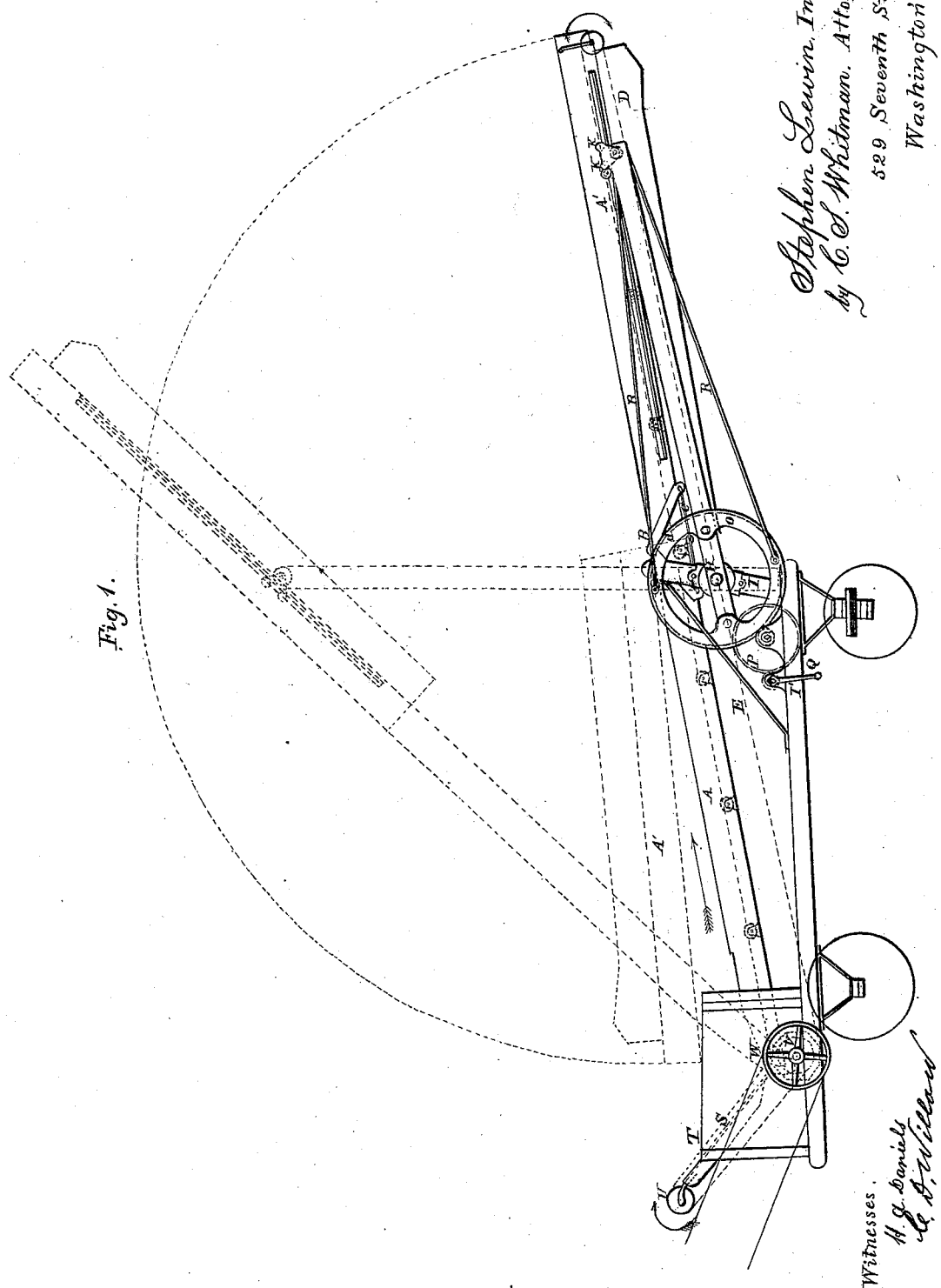

United States Patent Office.

STEPHEN LEWIN, OF POOLE, ENGLAND.

Letters Patent No. 109,523, dated November 22, 1870.

IMPROVEMENT IN ELEVATORS FOR RAISING AND STACKING STRAW.

The Schedule referred to in these Letters Patent and making part of the same.

*To all whom it may concern:*

Be it known that I, STEPHEN LEWIN, of Poole, in the county of Dorset, England, have invented "an Improved Elevator for Raising and Stacking Straw, Hay, and other similar substances;" and do hereby declare that the following description, taken in connection with the accompanying drawing, hereinafter referred to, forms a full and exact specification of the same, wherein I have set forth the nature and principles of my said improvement, by which my invention may be distinguished from others of a similar class, together with such parts as I claim and desire to secure by Letters Patent; that is to say—

One part of my invention consists, firstly, in providing, underneath the main trough of the elevator, a second trough, through which the straw or sheaf-carriers, after turning over the top roller, are made to pass in their downward passage, whereby the said carriers are prevented from drawing the sheaf or straw down again.

Another part of my invention consists in providing the main trough with a joint at or about the middle of its length, so that the upper part can be folded down over the lower part, and thus the elevator be rendered more compact for transport. When opened out, the joint of the trough is held secure by a catch or other fastening.

Another part of my invention has reference to the mode of raising and lowering the main poles and trough, and the mode of connecting the former to the latter. The main poles are stayed or trussed at the sides by means of tension-rods, and are arranged to turn, at or near their lower ends, upon pins fixed to uprights carried by the framing. To the lower ends of the poles are fixed toothed wheels or quadrants, in gear with which are pinions, actuated through suitable power-increasing gearing by means of winch-handles. The upper ends of the poles (which are attached together by a transverse bar or rod) are connected, in such a manner, to the upper end of the trough, either by means of rails on the sides of the latter, fitting between anti-friction rollers fixed to the former, or by other suitable known sliding connections, that the poles, in being raised by the before-mentioned gearing, raise the upper end of the trough, and at the same time slide along the rails or other contrivance fixed thereto. By this means either the entire trough may be raised or lowered to any angle, or the upper part may be turned over onto the lower part, by the before-mentioned hinged joint.

Another part of my invention consists in providing anti-friction rollers in the main trough, for the chains of the carriers to pass over, in order to prevent the carriers from rubbing against the guides to such an extent as is at present the case.

Another part of my invention consists in providing the front incline trough with endless chains, traveling over wheels, in order to prevent the straw or hay from lodging either at the sides or the end of the receiver.

On the accompanying drawing is shown my before-described improved elevator.

Figure 1, Sheet I, shows a side elevation;
Figure 2, Sheet II, shows a plan; and
Figure 3, Sheet II, shows an end elevation of the same.

The main trough A A' is divided in its length at $a$, the two parts being connected together by hinges, B, at the top of the trough, so that the upper part, A', of the trough can be turned over onto the lower part, A, as shown in dotted lines in fig. 1.

When opened out the two parts of the trough are secured in that position by links or catches, C, underneath.

Beneath the upper part, A', of the trough is fixed a second trough or chute, D, through which the carrier-chains E, on passing over the pulleys F, after having deposited the straw raised by the carriers, descend, thus preventing such straw from being dragged down again.

The main trough A A' turns, as usual, upon a fixed axis at its lower end, and is raised or lowered into any desired position by means of the supports or poles G turning at their lower ends, on strong pins, H, fixed to the uprights I of the carriage I', the upper ends of which poles are connected to the part A' of the trough by fitting with anti-friction rollers, K K', against angle-iron rails, L, fixed to the side of the trough, the rails being made to pass between the upper rollers, K, and the lower one, K'.

These rollers are carried by cheeks, M, capable of turning upon a rod, N, which ties the two poles G together, and it will be seen that, as the poles are raised into the position shown in dotted blue lines, the rollers K K', while raising the trough, pass down along the side rails L, and at the same time turn, with the cheeks M, upon the tie-rod N. The trough may by this means either be raised into any desired position, or the part A' may thereby be turned right over onto A, as before mentioned.

For effecting the raising and lowering of the poles, these have fixed thereto toothed wheels, O, in gear with which is suitable power-increasing gearing, P, turned by winch-handles, Q.

The poles are stayed laterally by means of tension-rods, R, secured to the sides of the toothed wheels O, as shown in fig. 1.

The front incline (or feed) trough S is also provided with endless-traveling chains, T, passing round pulleys, U, at the top of the trough, and round other pulleys on the same shaft, V, that carries the pulleys of the carrier-chains to the main trough, and which is driven by the pulley and belt W.

X X are anti-friction rollers, provided in the trough A A', over which the chains of the carriers pass, as before mentioned.

Having thus described the nature of my invention, and in what manner the same is to be performed, I wish it to be understood that I do not limit myself to the precise combination of the several parts thereof, as shown in the accompanying drawing; but

What I claim is—

1. A second trough beneath the main trough, substantially as and for the purposes set forth.

2. The main trough, when jointed at or about the middle of its length, so that the upper part can be turned over the lower part, substantially as described.

3. The toothed wheels fixed to the poles, and driven by suitable gearing from a winch-handle, the poles being connected to the trough by a sliding connection, and being made to turn on pins carried by the framing, substantially as described.

4. Anti-friction rollers arranged in the main trough for the carrier-chains to pass over, substantially as described.

5. The front incline trough, provided with traveling chains, as and for the purpose set forth.

In testimony whereof, I have signed my name to this specification in the presence of two subscribing witnesses this 19th day of April, 1870.

STEPHEN LEWIN.

Witnesses:
CHAS. D. ABEL,
JNO. P. M. MILLARD.